(12) United States Patent
Schneider et al.

(10) Patent No.: US 7,347,938 B2
(45) Date of Patent: Mar. 25, 2008

(54) USE OF HYDROPHOBICALLY MODIFIED COPOLYMERS BASED ON N-VINYL MONOMERS FOR THE PRODUCTION OF MEMBRANES

(75) Inventors: Tanja Schneider, Bensheim (DE); Frank Dietsche, Schriesheim (DE); Axel Sanner, Frankenthal (DE); Stefan Stein, Woerrstadt (DE); Karin Neubecker, Frankenthal (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 325 days.

(21) Appl. No.: 10/507,362

(22) PCT Filed: Apr. 11, 2003

(86) PCT No.: PCT/EP03/03764

§ 371 (c)(1), (2), (4) Date: Sep. 20, 2004

(87) PCT Pub. No.: WO03/086594

PCT Pub. Date: Oct. 23, 2003

(65) Prior Publication Data

US 2005/0126987 A1 Jun. 16, 2005

(30) Foreign Application Priority Data

Apr. 18, 2002 (DE) .............................. 102 17 440

(51) Int. Cl.
| | |
|---|---|
| B01D 39/14 | (2006.01) |
| B01D 71/06 | (2006.01) |
| B01D 39/00 | (2006.01) |
| B01D 11/00 | (2006.01) |
| B29C 67/20 | (2006.01) |
| B01D 63/00 | (2006.01) |

(52) U.S. Cl. .................... 210/500.27; 210/500.29; 210/500.34; 210/500.36; 210/500.4; 210/500.41; 210/500.42; 264/49

(58) Field of Classification Search ........... 210/500.23, 210/500.27, 500.21, 500.34, 500.35, 500.4, 210/500.41, 500.42, 500.36, 645, 321.6, 210/500.29; 264/48, 49

See application file for complete search history.

(56) References Cited

U.S. PATENT DOCUMENTS

| | | | | |
|---|---|---|---|---|
| 4,268,641 A | * | 5/1981 | Koenig et al. .............. 525/367 |
| 4,304,591 A | | 12/1981 | Good et al. | |
| 4,720,345 A | * | 1/1988 | Linder et al. ............... 210/650 |
| 4,780,411 A | * | 10/1988 | Piejko et al. ................. 422/56 |
| 4,889,636 A | * | 12/1989 | Perry et al. .................. 210/651 |
| 4,976,897 A | * | 12/1990 | Callahan et al. ............ 264/425 |
| 5,407,581 A | * | 4/1995 | Onodera et al. ............ 210/654 |
| 5,942,120 A | * | 8/1999 | Wilkinson .................. 210/651 |
| 6,113,785 A | * | 9/2000 | Miura et al. ........... 210/500.41 |
| 6,132,705 A | * | 10/2000 | Schehlmann et al. .... 424/78.02 |
| 6,214,936 B1 | * | 4/2001 | Mehler et al. ................ 525/89 |
| 6,723,814 B2 | * | 4/2004 | Meier et al. ................ 526/279 |
| 7,056,726 B2 | * | 6/2006 | Legeay et al. ........... 435/297.1 |

FOREIGN PATENT DOCUMENTS

| | | |
|---|---|---|
| DE | 198 17 364 | 7/1999 |
| EP | 0 082 433 | 6/1983 |
| EP | 0 168 783 | 1/1986 |
| EP | 0 523 510 | 1/1993 |
| EP | 0 550 798 | 7/1993 |
| EP | 0 636 404 | 2/1995 |
| EP | 0 876 819 | 11/1998 |
| EP | 0 953 358 | 11/1999 |
| WO | 02 09857 | 2/2002 |
| WO | 02 076593 | 10/2002 |

\* cited by examiner

*Primary Examiner*—Ana Fortuna
(74) *Attorney, Agent, or Firm*—Oblon, Spivak, McClelland, Maier & Neustadt, P.C.

(57) ABSTRACT

The present invention relates to the use of copolymers A containing
 a) from 50 to 99% by weight of at least one N-vinyllactam or N-vinylamine selected from the group consisting of N-vinylpyrrolidone, N-vinylpiperidone, N-vinylcaprolactam, N-vinylimidazole, methylated N-vinylimidazole, and N-vinylformamide, and
 b) from 1 to 50% by weight of at least one monomer selected from the group consisting of
  $b_1$) $C_8$-$C_{30}$-alkyl esters of monoethylenically unsaturated $C_3$-$C_8$ carboxylic acids;
  $b_2$) N—$C_8$-$C_{30}$-alkyl-substituted amides of monoethylenically unsaturated $C_3$-$C_8$ carboxylic acids;
  $b_3$) N,N—$C_8$-$C_{30}$-dialkyl-substituted amides of monoethylenically unsaturated $C_3$-$C_8$ carboxylic acids;
  $b_4$) vinyl esters of aliphatic $C_8$-$C_{30}$ carboxylic acids; and
  $b_5$) $C_8$-$C_{30}$-alkyl vinyl ethers
to produce membranes.

21 Claims, No Drawings

USE OF HYDROPHOBICALLY MODIFIED COPOLYMERS BASED ON N-VINYL MONOMERS FOR THE PRODUCTION OF MEMBRANES

The present invention relates to the use of copolymers A containing a) from 50 to 99% by weight of at least one N-vinyllactam or N-vinylamine selected from the group consisting of N-vinylpyrrolidone, N-vinylpiperidone, N-vinylcaprolactam, N-vinylimidazole, methylated N-vinylimidazole, and N-vinylformamide, and b) from 1 to 50% by weight of at least one monomer selected from the group consisting of
   $b_1$) $C_8$-$C_{30}$-alkyl esters of monoethylenically unsaturated $C_3$-$C_8$ carboxylic acids;
   $b_2$) N—$C_8$-$C_{30}$-alkyl-substituted amides of monoethylenically unsaturated $C_3$-$C_8$ carboxylic acids;
   $b_3$) N,N—$C_8$-$C_{30}$-dialkyl-substituted amides of monoethylenically unsaturated $C_3$-$C_8$ carboxylic acids;
   $b_4$) vinyl esters of aliphatic $C_8$-$C_{30}$ carboxylic acids; and
   $b_5$) $C_8$-$C_{30}$-alkyl vinyl ethers to produce membranes.

The present invention further provides a semipermeable membrane comprising, as well as the copolymers described above, one or more hyrophobic polymers and also one or more hydrophilic polymers.

For a multiplicity of industrial applications use is nowadays made of membranes. For instance, membranes can be used to convert salt water into drinking water by reverse osmosis. Membranes are additionally suitable for cleaning industrial wastewaters or for recovering substances of value: for example, for recovering coating materials by ultrafiltration from electrocoating baths. In the sectors of food technology, medicine and pharmacy, as well, membranes are increasingly finding application. For example, solutions of different macromolecules can be fractionated using membranes, or urea and toxins can be removed from the bloodstream in hemodialysis. For skin-controlled delivery of drugs, too, membranes can be used.

It is known that the morphology of a membrane is a critical determinant of its field of use. Selectivity and permeability are defined by the surface structure and surface coverage of a porous membrane, while the internal structure influences the mechanical properties of a membrane. In the manufacture of a membrane, therefore, attempts are made to tailor both the surface and the internal structure by an appropriate combination of the parameters which are set during the production process. Important influencing variables, such as the nature and composition of the polymers and solvents used to form the membranes, have been described in detail in EP-A 0 168 783.

EP-A 0 168 783 describes asymmetric microporous hollow fiber membranes for blood treatment which are composed of more than 90% by weight of a hydrophobic polysulfone matrix polymer and also from 1 to 10% by weight of hydrophilic polyvinylpyrrolidone, which are readily wettable by water, and which exhibit excellent biocompatibility; that is, the substances of the body's own defense system which are present in the blood do not respond to the surface of the membranes. The incompatible hydrophilic polymers serve as pore formers and are washed out of the membrane following its solidification, although a certain fraction is to remain in order to render the otherwise hydrophobic membrane hydrophilic.

Causing part of the hydrophilic PVP to remain in the polysulfone matrix is achieved in accordance with EP-A 0 168 783 by extruding the solution of the two polymers within a narrowly confined viscosity range, thereby ensuring that the structure of the extruded hollow-fibrous formation is maintained until the fiber-forming polymer is precipitated and that, although the majority of the PVP used is washed from the spinning composition during precipitation, a fraction nevertheless remains in the membrane.

DE-A 19817364 describes producing membranes with predetermined hydrophilicity and porosity. To this end a hydrophilic polymer with bimodal molecular weight distribution is used. The low molecular weight fraction which can be washed out more readily following precipitation serves here to tailor the porosity. The high molecular weight fraction on the other hand, which is less readily washed out, determines the hydrophilicity of the membrane.

From EP-A 0 550 798 it is known that in membranes, like those obtained, for example, in accordance with EP-A 0 168 783, water-soluble PVP is still present. Accordingly, it is impossible to avoid minimal amounts being given off from these membranes to the medium under filtration when these membranes are used repeatedly a large number of times. As a result there is a change in (among other things) the retention properties of such membranes to more indistinct cutoff limits. Possibilities for making the PVP present in polysulfone membranes insoluble in water are described, for example, in EP-A 0 082 433 and EP-A 0 550 798. They describe formation of a three-dimensional network by means of chemical crosslinking and, respectively, crosslinking by means of ionizing radiation.

EP-A 0 876 819 and EP-A 0 953 358 disclose the use of copolymers of N-vinyllactams or N-vinylamine compounds and hydrophobically modified monomers as matrix components for producing solid pharmaceutical administration forms or cosmetic presentation forms.

It is an object of the present invention to reduce or suppress entirely the propensity of the hydrophilicizing component to be washed out of the membrane while retaining the membrane porosity.

We have found that this object is achieved by the use of the above-defined copolymers A in the production of semipermeable membranes and by the corresponding membranes.

Components a) of the copolymers A include the following polymerizable hydrophilic comonomers:

N-Vinyllactams and N-vinylamines, especially N-vinylpyrrolidone, N-vinylpiperidone, N-vinylcaprolactam, N-vinylimidazole, N-vinyl-2-methylimidazole, N-vinyl-4-methylimidazole, and N-vinylformamide.

Preferred hydrophilic components are N-vinylpyrrolidone, N-vinylimidazole and N-vinylcaprolactam, with particular preference N-vinylpyrrolidone.

The fraction of the hydrophilic monomer units a) in the copolymer is in the range from 50 to 99% by weight, preferably from 60 to 99% by weight, with particular preference from 65 to 98% by weight.

Components b) include the following polymerizable hydrophobic comonomers:

$b_1$) esters of monoethylenically unsaturated $C_3$-$C_8$ carboxylic acids with a $C_8$-$C_{30}$ alcohol, preferably a $C_{12}$-$C_{22}$ alcohol.

By monoethylenically unsaturated carboxylic acids having from 3 to 8 carbon atoms are meant, for example, acrylic acid, methacrylic acid, dimethacrylic acid, ethacrylic acid, maleic acid, citraconic acid, methylenemalonic acid, allylacetic acid, vinylacetic acid, crotonic acid, fumaric acid, mesaconic acid, and itaconic acid.

From this group of carboxylic acids use is made preferably of acrylic acid, methacrylic acid, maleic acid or mixtures of said carboxylic acids, with particular preference methacrylic acid.

Particular importance here is attached to the esters of acrylic and/or methacrylic acid with fatty alcohols having a chain length of from 12 to 22 carbon atoms.

Mention may be made here preferably of the following: myristyl acrylate, cetyl acrylate, stearyl acrylate, oleyl acrylate, behenyl acrylate, myristyl methacrylate, cetyl methacrylate, stearyl methacrylate, oleyl methacrylate, and behenyl methacrylate, particular preference being given, from this group, to the $C_{12}$-$C_{22}$-alkyl esters of methacrylic acid.

As further hydrophobic comonomers it is possible to use $b_2$) N—$C_8$-$C_{30}$-alkyl-substituted or $b_3$) N,N—$C_8$-$C_{30}$-dialkyl-substituted amides of monoethylenically unsaturated $C_3$-$C_8$ carboxylic acids, the alkyl radicals being aliphatic or cycloaliphatic alkyl radicals having from 8 to 30, preferably from 8 to 22, with particular preference from 12 to 18 carbon atoms.

The amidated monoethylenically unsaturated carboxylic acids having from 3 to 8 carbon atoms may, as already mentioned above, stand, for example, for acrylic acid, methacrylic acid, dimethacrylic acid, ethacrylic acid, maleic acid, citraconic acid, methylenemalonic acid, allylacetic acid, vinylacetic acid, crotonic acid, fumaric acid, mesaconic acid, and itaconic acid.

From this group of carboxylic acids preference is likewise given to using acrylic acid, methacrylic acid, maleic acid or mixtures of said carboxylic acids.

Examples of preferred amidated comonomers are N-octylacrylamide, N-(2-ethylhexyl)acrylamide, N-nonylacrylamide, N-decylacrylamide, N-laurylacrylamide, N-myristylacrylamide, N-cetylacrylamide, N-stearylacrylamide, N-oleylacrylamide, N-behenylacrylamide, N-octylmethacrylamide, N-(2-ethylhexyl)methacrylamide, N-nonylmethacrylamide, N-decylmethacrylamide, N-laurylmethacrylamide, N-myristylmethacrylamide, N-cetylmethacrylamide, N-stearylmethacrylamide, N-oleylmethacrylamide, and N-behenylmethacrylamide, particular emphasis being placed, from this group, on the $C_{12}$-$C_{18}$-alkylamides.

As a further, additional component b) it is possible to use vinyl esters of long-chain aliphatic, saturated or unsaturated $C_8$-$C_{30}$ carboxylic acids, such as caprylic acid, capric acid, lauric acid, myristic acid, palmitic acid, stearic acid, arachic acid, behenic acid, lignoceric acid, cerotinic acid, and melissic acid. Vinyl esters of the abovementioned $C_8$-$C_{18}$ carboxylic acids find preferred use.

Furthermore, $C_8$-$C_{30}$-alkyl vinyl ethers, preferably $C_8$-$C_{22}$-alkyl vinyl ethers, can be copolymerized as comonomers $b_5$).

Preferred $C_8$-$C_{22}$-alkyl radicals of the vinyl ethers include unbranched alkyl chains such as n-octyl, 2-ethylhexyl, n-nonyl, n-decyl, n-undecyl, n-dodecyl, n-tridecyl, n-tetradecyl, n-pentadecyl, n-hexadecyl, n-heptadecyl, and n-octadecyl.

The fraction of the hydrophobic monomer units b) in the copolymer A is in the range from 1 to 50% by weight, preferably from 1 to 40% by weight, with particular preference from 2 to 35% by weight.

It will be appreciated that mixtures of two or more carboxylic acids, carboxamides, alkyl vinyl ethers or vinyl esters can be used as long as the sum of the fractions of these comonomers does not exceed 50% by weight.

Where appropriate it may be sensible to use, for the polymerization, not only the abovementioned monomers units a) and b) but also the comonomers c) listed below:

monoethylenically unsaturated carboxylic acids having from 3 to 8 carbon atoms such as acrylic acid, methacrylic acid, dimethacrylic acid, ethacrylic acid, maleic acid, citraconic acid, methylenemalonic acid, allylacetic acid, vinylacetic acid, crotonic acid, fumaric acid, mesaconic acid, and itaconic acid. From this group of monomers it is preferred to use acrylic acid, methacrylic acid, maleic acid or mixtures of said carboxylic acids.

The monoethylenically unsaturated carboxylic acids can be used in the form of the free acids and—where available—the anhydrides or in partly or fully neutralized form for the copolymerization.

For neutralization it is preferred to use alkali metal or alkaline earth metal bases, ammonia or amines, e.g., sodium hydroxide solution, potassium hydroxide solution, sodium carbonate, potash, sodium hydrogen carbonate, magnesium oxide, calcium hydroxide, calcium oxide, gaseous or aqueous ammonia, triethylamine, ethanolamine, diethanolamine, triethanolamine, morpholine, diethylenetriamine or tetraethylenepentamine.

Examples of further suitable comonomers c) are the $C_1$-$C_4$-alkyl or hydroxyalkyl esters, amides, and nitriles of the abovementioned carboxylic acids, e.g., methyl acrylate, ethyl acrylate, methyl methacrylate, ethyl methacrylate, hydroxyethyl acrylate, hydroxypropyl acrylate, hydroxybutyl acrylate, hydroxyethyl methacrylate, hydroxypropyl methacrylate, hydroxyisobutyl acrylate, hydroxyisobutyl methacrylate, monomethyl maleate, dimethyl maleate, monoethyl maleate, diethyl maleate, acrylamide, methacrylamide, N,N-dimethylacrylamide, N-tert-butylacrylamide, acrylonitrile, methacrylonitrile, dimethylaminoethyl acrylate, diethylaminoethyl acrylate, diethylaminoethyl methacrylate, and the salts of the last-mentioned monomers with carboxylic acids or mineral acids, and also the quaternized products.

Also suitable as other, copolymerizable monomers are acrylamidoglycolic acid, vinylsulfonic acid, allylsulfonic acid, methallylsulfonic acid, styrenesulfonic acid, 3-sulfopropyl acrylate, 3-sulfopropyl methacrylate, and acrylamidomethylpropanesulfonic acid, and also monomers containing phosphonic acid groups, such as vinylphosphonic acid, allylphosphonic acid, and acrylamidomethylpropanephosphonic acid.

The fraction of the monomer units c) in the copolymer can be in the range from 0 to 30% by weight, preferably from 0 to 20% by weight, with particular preference from 0 to 10% by weight, the percentages by weight for components a) to c) adding up to 100%.

Used preferably are water-insoluble copolymers A containing
a) from 60 to 99% by weight of N-vinylpyrrolidone and
b) from 1 to 40% by weight of at least one monomer selected from the group consisting of
   $b_1$) $C_8$-$C_{30}$-alkyl esters of monoethylenically unsaturated $C_3$-$C_8$ carboxylic acids;
   $b_2$) N—$C_8$-$C_{30}$-alkyl-substituted amides of monoethylenically unsaturated $C_3$-$C_8$ carboxylic acids;
   $b_3$) N,N—$C_8$-$C_{30}$-dialkyl-substituted amides of monoethylenically unsaturated $C_3$-$C_8$ carboxylic acids;
   $b_4$) vinyl esters of aliphatic $C_8$-$C_{30}$ carboxylic acids; and
   $b_5$) $C_8$-$C_{30}$-alkyl vinyl ethers.

Use is made with particular preference of water-insoluble copolymers A containing a) from 60 to 99% by weight of N-vinylpyrrolidone and
b) from 1 to 40% by weight of at least one monomer selected from the group consisting of
   $b_1$) $C_{12}$-$C_{22}$-alkyl esters of monoethylenically unsaturated $C_3$-$C_8$ carboxylic acids;
   $b_2$) N—$C_{12}$-$C_{18}$-alkyl-substituted amides of monoethylenically unsaturated $C_3$-$C_8$ carboxylic acids;
   $b_3$) N,N—$C_{12}C_{18}$-dialkyl-substituted amides of monoethylenically unsaturated $C_3$-$C_8$ carboxylic acids;
   $b_4$) vinyl esters of aliphatic $C_8$-$C_{18}$ carboxylic acids; and
   $b_5$) $C_8$-$C_{22}$-alkyl vinyl ethers.

Particularly suitable are copolymers A including as monomer units b) the monomers $b_1$) with an alkyl radical of chain length $C_{14}$ to $C_{18}$.

The copolymers are prepared by known processes, e.g., solution, precipitation, emulsion or inverted suspension polymerization, using compounds which form free radicals under the polymerization conditions.

The temperatures of polymerization are usually in the range from 30 to 200° C., preferably from 40 to 110° C.

Examples of suitable initiators are azo compounds and peroxy compounds and also the customary redox initiator systems, such as combinations of hydrogen peroxide and compounds having a reducing action, e.g., sodium sulfite, sodium bisulfite, sodium formaldehyde-sulfoxylate, and hydrazine.

The copolymers A possess K values of at least 20, preferably from 25 to 100, with particular preference from 30 to 80. The K values are determined by the method of H. Fikentscher, Cellulose-Chemie, Volume 13, 58 to 64 and 71 to 74 (1932) in aqueous or alcoholic solution at 25° C., at concentrations of between 0.1% and 5% depending on the K value range.

The average molecular weight of the polymers A used in accordance with the invention is in the range from 30 000 to 10 000 000, preferably from 35 000 to 2 000 000, with particular preference from 40 000 to 1 500 000.

The polymer dispersions or solutions obtained can be converted into powder form by various drying processes such as, for example, spray drying, fluidized spray drying, roller drying or freeze drying, and an aqueous dispersion can be produced from this powder form by redispersing it in water.

Besides the copolymers A for use in accordance with the invention the membranes comprise, as a further component, component B, one or more polymers selected from the group consisting of polysulfones such as polyaryl ether sulfones, polycarbonates, polyamides, polyvinyl chloride, hydrophobically modified acrylic acid polymers, polyethers, polyurethanes, polyurethane copolymers, water-insoluble cellulose derivatives such as cellulose acetates, cellulose nitrates, and mixtures thereof. The preparation of these polymers is common knowledge. In production of the membranes they can be used in amounts of from 50 to 90.9% by weight, preferably from 60 to 90% by weight. It is preferred to use polysulfones, polyamides or blends of polysulfones and polyamides.

The membranes may further comprise one or more hydrophilic polymers C selected from the group consisting of polyvinylpyrrolidones, polyethylene glycols, polyglycol monoesters, polyethylene glycol-propylene glycol copolymers, water-soluble cellulose derivates, and polysorbates. These hydrophilic polymers C may be used in amounts of from 0 to 50% by weight, preferably from 10 to 40% by weight, in the production of the membranes. As polymers C it is preferred to use polyvinylpyrrolidones, with particular preference in combination with polysulfones, polyamides or blends of polysulfones and polyamides.

In principle the copolymers A used in accordance with the invention are suitable for producing any of a very wide variety of wettable membrane types such as microporous membranes, examples being microporous hollow fiber membranes, homogeneous membranes, symmetrical membranes, and asymmetrical membranes. With preference, microporous or asymmetrical membranes can be produced. The production of the various types of membrane is known to the skilled worker from the prior art.

Generally, the various components are converted into a solution which is then shaped appropriately, by casting or spinning for example.

The membranes are produced conventionally, for example, by a phase inversion process, such as is described in EP-A 082 433, hereby incorporated by reference.

Furthermore, it is also possible to obtain hollow fiber membranes by extrusion and precipitation of a polymer-containing spinning solution. A process of this kind is described, for example, in EP-A 168 783, likewise incorporated by reference.

Surprisingly it has been found that when the copolymers A of the invention are used the fraction of water-soluble polymer component which can be washed out of a membrane is reduced. With no change in the hydrophilicity of the membrane surface and with partial or complete replacement of the water-soluble polymers by the copolymers, the surface of the membrane was found to be permanent in respect of pore size and-pore distribution.

The following examples are intended to illustrate but not restrict the process of the invention.

EXAMPLES

Example 1

A polymer solution composed of 16% by weight of polysulfone (Ultrason E 6020P, BASF), 1% by weight of polyvinylpyrrolidone having a K value of 90, 7% by weight of polyvinylpyrrolidone having a K value of 30 and 1% by weight of a vinylpyrrolidone-stearyl methacrylate copolymer (VP:StMA=70:30) in N-methylpyrrolidone was applied in a 200 µm film using a casting apparatus to a PVC carrier web and was coagulated in water for 10 minutes at 20° C. The membrane was dried at 40° C. for 24 hours.

The dry membrane was weighed, after which water was passed through it for 30 minutes. The weight loss was determined after the membrane had been dried again at 40° C. for 24 hours. In order to assess the washout of the hydrophilic polymer components, this procedure was repeated twice after 20 hours and 36 hours of water passage.

Examples 2 to 6

The membranes were obtained from polymer solutions differing in composition in analogy to the production instructions from Example 1. The weight loss of membranes in the following examples was determined in analogy to example 1.

| Example | B polysulfone [wt. %] | C PVP K30 [wt. %] | C PVP K90 [wt. %] | Copolymer A [wt. %] Composition VP/SMA 70:30 | Weight loss [%] 0.5 h | 20 h | 36 h |
|---|---|---|---|---|---|---|---|
| 1 | 64 | 28 | 4 | 4 | 14.7 | 22.6 | 24.5 |
| 2 | 64 | 28 | 0 | 8 | 11.8 | 21.4 | 23.1 |
| 3 | 64 | 28 | 8 | 0 | 11.4 | 26.1 | 28.3 |
| 4 | 53.3 | 33.3 | 6.6 | 6.6 | 21.2 | 35.2 | 35.9 |
| 5 | 53.3 | 33.3 | 0 | 13.3 | 17.9 | 34.4 | 35.3 |
| 6 | 53.3 | 33.3 | 13.3 | 0 | 27.2 | 43.4 | 44.4 |

The percentages by weight indicated in the table refer to the theoretical content which is to be expected in the membrane in its dry state.

Examples 7 to 12

The membranes obtained in accordance with examples 1 to 6 were subjected to contact angle measurements using a contact angle measuring instrument of the type OCAH200 from Data Physics.

| Example | Membrane from example | Contact angle (dist. water) [degrees] 0.1 s | 1 s | 10 s |
|---|---|---|---|---|
| 7 | 1 | 72 | 69 | 69 |
| 8 | 2 | 78 | 74 | 74 |
| 9 | 3 | 71 | 68 | 68 |
| 10 | 4 | 74 | 72 | 71 |
| 11 | 5 | 71 | 71 | 69 |
| 12 | 6 | 75 | 71 | 71 |

We claim:

1. A method for producing a membrane comprising forming said membrane from a copolymer A comprising
    a) from 50 to 99% by weight of at least one N-vinyllactam or N-vinylamine selected from the group consisting of N-vinylpyrrolidone, N-vinylpiperidone, N-vinylcaprolactam, N-vinylimidazole, methylated N-vinylimidazole, and N-vinylformamide, and
    b) from 1 to 50% by weight of at least one monomer selected from the group consisting of
        b1) $C_8$-$C_{30}$-alkyl esters of monoethylenically unsaturated $C_3$-$C_8$ carboxylic acids;
        b2) N—$C_8$-$C_{30}$-alkyl-substituted amides of monoethylenically unsaturated $C_3$-$C_8$ carboxylic acids;
        b3) N,N—$C_8$-$C_{30}$-dialkyl-substituted amides of monoethylenically unsaturated $C_3$-$C_8$ carboxylic acids;
        b4) vinyl esters of aliphatic $C_8$-$C_{30}$ carboxylic acids; and
        b5) $C_8$-$C_{30}$-alkyl vinyl ethers
and a hydrophobic polymer B selected from the group consisting of polysulfones, polycarbonates, polyamides, polyvinyl chloride, hydrophobically modified acrylic polymers, polyethers, polyurethanes, polyurethane copolymers, water-insoluble cellulose derivatives, and mixtures thereof.

2. A method as claimed in claim 1 wherein copolymer A comprises
    a) from 60 to 99% by weight of N-vinylpyrrolidone and
    b) from 1 to 40% by weight of at least one monomer selected from the group consisting of
        b1) $C_8$-$C_{30}$-alkyl esters of monoethylenically unsaturated $C_3$-$C_8$ carboxylic acids;
        b2) N—$C_8$-$C_{30}$-alkyl-substituted amides of monoethylenically unsaturated $C_3$-$C_8$ carboxylic acids;
        b3) N,N—$C_8$-$C_{30}$-dialkyl-substituted amides of monoethylenically unsaturated $C_3$-$C_8$ carboxylic acids;
        b4) vinyl esters of aliphatic $C_8$-$C_{30}$ carboxylic acids; and
        b5) $C_8$-$C_{30}$-alkyl vinyl ethers.

3. A method as claimed in claim 1 wherein copolymer A comprises
    a) from 60 to 99% by weight of N-vinylpyrrolidone and
    b) from 1 to 40% by weight of at least one monomer selected from the group consisting of
        b1) $C_{12}$-$C_{22}$-alkyl esters of monoethylenically unsaturated $C_3$-$C_8$ carboxylic acids;
        b2) N—$C_{12}$-$C_{18}$-alkyl-substituted amides of monoethylenically unsaturated $C_3$-$C_8$ carboxylic acids;
        b3) N,N—$C_{12}$-$C_{18}$-dialkyl-substituted amides of monoethylenically unsaturated $C_3$-$C_8$ carboxylic acids;
        b4) vinyl esters of aliphatic $C_8$-$C_{18}$ carboxylic acids; and
        b5) $C_8$-$C_{22}$-alkyl vinyl ethers.

4. A method as claimed in claim 1, wherein copolymer A is present in an amount of from 0.1 to 25% by weight, based on the total amount of polymers.

5. A method as claimed in claim 1, wherein copolymer A is present in combination with one or more further polymers.

6. A method as claimed in claim 1, wherein the hydrophobic polymer B is present in an amount of from 50 to 99.9% by weight, based on the total amount of polymers.

7. A method as claimed in claim 1, wherein the membrane further comprises, as polymer C, at least one hydrophilic polymers selected from the group consisting of polyvinylpyrrolidones, polyethylene glycols, polyethylene glycol monoesters, polyethylene glycol-propylene glycol copolymers, water-soluble cellulose derivatives, polysorbates, and mixtures thereof.

8. A method as claimed in claim 7, wherein the hydrophilic polymer C is present in an amount of from 10 to 40% by weight, based on the total amount of polymers.

9. A method as claimed in claim 1, wherein copolymer A comprises monomer b1.

10. A method as claimed in claim 1, wherein copolymer A comprises monomer b2.

11. A method as claimed in claim 1, wherein copolymer A comprises monomer b3.

12. A method as claimed in claim 1, wherein copolymer A comprises monomer b4.

13. A method as claimed in claim 1, wherein copolymer A comprises monomer b5.

14. A semipermeable, water-wettable membrane comprising at least one copolymer A formed from
    a) from 50 to 99% by weight of at least one N-vinyllactam or N-vinylamine selected from the group consisting of N-vinylpyrrolidone, N-vinylpiperidone, N-vinylcaprolactam, N-vinylimidazole, methylated N-vinylimidazole, and N-vinylformamide, and
    b) from 1 to 50% by weight of at least one monomer selected from the group consisting of
        b1) $C_8$-$C_{30}$-alkyl esters of monoethylenically unsaturated $C_3$-$C_8$ carboxylic acids;
        b2) N—$C_8$-$C_{30}$-alkyl-substituted amides of monoethylenically unsaturated $C_3$-$C_8$ carboxylic acids;
        b3) N,N—$C_8$-$C_{30}$-dialkyl-substituted amides of monoethylenically unsaturated $C_3$-$C_8$ carboxylic acids;

b4) vinyl esters of aliphatic $C_8$-$C_{30}$ carboxylic acids; and b5) $C_8$-$C_{30}$-alkyl vinyl ethers, and a hydrophobic polymer component B, selected from the group consisting of polysulfones, polycarbonates, polyamides, polyvinyl chloride, hydrophobically modified acrylic polymers, polyethers, polyurethanes, polyurethane copolymers, cellulose acetates, cellulose nitrates, and mixtures thereof.

15. A membrane as claimed in claim 14, comprising copolymer A in an amounts of from 0.1 to 25% by weight.

16. A membrane as claimed in claim 14, further comprising a hydrophilic polymer C selected from the group consisting of polyvinylpyrrolidones, polyethylene glycols, polyglycol monoesters, copolymers of polyethylene glycol with propylene glycol, water-soluble derivatives of cellulose, polysorbates, and mixtures thereof.

17. A membrane as claimed in claim 14, wherein copolymer A comprises monomer b1.

18. A membrane as claimed in claim 14, wherein copolymer A comprises monomer b2.

19. A membrane as claimed in claim 14, wherein copolymer A comprises monomer b3.

20. A membrane as claimed in claim 14, wherein copolymer A comprises monomer b4.

21. A membrane as claimed in claim 14, wherein copolymer A comprises monomer b5.

* * * * *